(12) United States Patent
Kameyama (10) Patent No.: US 12,474,713 B2
(45) Date of Patent: Nov. 18, 2025

(54) MAP DATA HAVING UNEQUAL INTERVAL

(71) Applicant: Honda Motor Co., Ltd., Tokyo (JP)

(72) Inventor: Naoki Kameyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 17/684,364

(22) Filed: Mar. 1, 2022

(65) Prior Publication Data

US 2023/0280760 A1 Sep. 7, 2023

(51) Int. Cl.
*G05D 1/00* (2006.01)
*G01C 21/00* (2006.01)

(52) U.S. Cl.
CPC ....... *G05D 1/0274* (2013.01); *G01C 21/3807* (2020.08)

(58) Field of Classification Search
None
See application file for complete search history.

(56) References Cited

U.S. PATENT DOCUMENTS

| | | | | |
|---|---|---|---|---|
| 5,870,099 A | * | 2/1999 | Horii | G06T 15/20 345/427 |
| 5,953,722 A | * | 9/1999 | Lampert | G08G 1/096827 701/461 |
| 5,968,109 A | * | 10/1999 | Israni | G06F 16/29 707/999.102 |
| 5,974,419 A | * | 10/1999 | Ashby | G06F 16/29 701/461 |
| 6,035,299 A | * | 3/2000 | White | G06F 16/00 707/999.102 |
| 6,112,200 A | * | 8/2000 | Livshutz | G01C 21/3878 701/461 |
| 10,845,804 B2 | * | 11/2020 | Holgersson | G05D 1/0265 |
| 11,526,536 B2 | * | 12/2022 | Huang | G08G 1/13 |
| 11,610,493 B1 | * | 3/2023 | Gilboa-Amir | G08G 5/53 |
| 2003/0200228 A1 | * | 10/2003 | White | G01C 21/3881 |
| 2005/0027445 A1 | * | 2/2005 | McDonough | G01C 21/3881 701/532 |
| 2009/0208098 A1 | * | 8/2009 | Yang | G06T 7/10 382/164 |
| 2015/0074002 A1 | * | 3/2015 | Johnson | G06Q 50/02 705/306 |

FOREIGN PATENT DOCUMENTS

| | | | | |
|---|---|---|---|---|
| CN | 101625414 A | * | 1/2010 | |
| CN | 102968122 A | * | 3/2013 | ........... G05D 1/0274 |
| CN | 107898393 B | * | 12/2020 | ............. A47L 11/24 |
| CN | 116339301 A | * | 6/2023 | |
| JP | 4037167 | | 1/2008 | |
| JP | 2009163156 | | 7/2009 | |
| JP | 2013033356 | | 2/2013 | |
| JP | 2016149090 | | 8/2016 | |

(Continued)

*Primary Examiner* — Redhwan K Mawari
*Assistant Examiner* — Kai Wang
(74) *Attorney, Agent, or Firm* — JCIPRNET (57) ABSTRACT

A map is stored in a robot that has a travelling unit, wherein the map is represented by a grid having a plurality of parcels, and a data set is assigned to each parcel such that the grid is represented by a plurality of data sets, each data set assigned to each parcel includes a characteristic value representing a characteristic of the parcel, and a grid value representing a shape of the parcel.

4 Claims, 10 Drawing Sheets

(56) References Cited

FOREIGN PATENT DOCUMENTS

| | | |
|---|---|---|
| JP | 6193898 | 9/2017 |
| JP | 6370899 | 8/2018 |
| WO | 2017010161 | 1/2017 |
| WO | 2019146407 | 8/2019 |
| WO | 2021209277 | 10/2021 |

\* cited by examiner

FIG. 1

| 1 | 2 | 3 |
|---|---|---|
| 4 | 5 | 6 |
| 7 | 8 | 9 |

Example
0:Work Area
1:Non-Work Area
2:Obstacle
3:Area Wire
4:Charging Station
5:Boundary Type #1
6:Boundary Type #2
7:Boundary Type #3
8:Boundary Type #4
9:Boundary Type #5

| 2 | 2 | 2 |
|---|---|---|
| 2 | 1 | 1 |
| 2 | 1 | 1 |

Conversion ⇒

M3

| 2 | |
|---|---|
| 2 | 1 |

STEP 1: Create Vertex Data List

Map data using Conventional method = {2, 2, 2, 2, 1, 1, 2, 1, 1}

Map data using Vertex Representation = {data set①, data set②, data set③, ..., data set⑨} data set ①={1, 1, 2, 2, 2}, data set ②={2, 1, 3, 2, 2}, data set ③={3, 1, 4, 2, 2}
data set ④={1, 2, 2, 3, 2}, data set ⑤={2, 2, 3, 3, 1}, data set ⑥={3, 2, 4, 3, 1}
data set ⑦={1, 3, 2, 4, 2}, data set ⑧={2, 3, 3, 4, 1}, data set ⑨={3, 3, 4, 4, 1}

FIG. 6

STEP 2: Reduce Column Data

FIG. 7

At end of STEP 2

Update Data set

STEP 3: Reduce Row Data

FIG. 9

At end of STEP 3

MAP DATA HAVING UNEQUAL INTERVAL

BACKGROUND OF THE DISCLOSURE

Technical Field

The disclosure relates to map data, and more specifically relates to map data having an unequal interval.

Related Art

Conventionally, an autonomous work vehicle stores map data of a work area. As the work area increases, a data size of the map data also increases such that handling of the data becomes difficult. For example, in some cases, 90% of an entire control software of the autonomous work vehicle may be map data.

Therefore, a way for decreasing the data size of the map data is needed. When the data size of the map data is decreased, then the hardware specification required for the autonomous work vehicle may be lowered.

SUMMARY

According to an embodiment of the disclosure, a map is stored in a robot that has a travelling unit, wherein the map is represented by a grid having a plurality of parcels, and a data set is assigned to each parcel such that the grid is represented by a plurality of data sets, each data set assigned to each parcel includes a characteristic value representing a characteristic of the parcel, and a grid value representing a shape of the parcel.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figure 1:
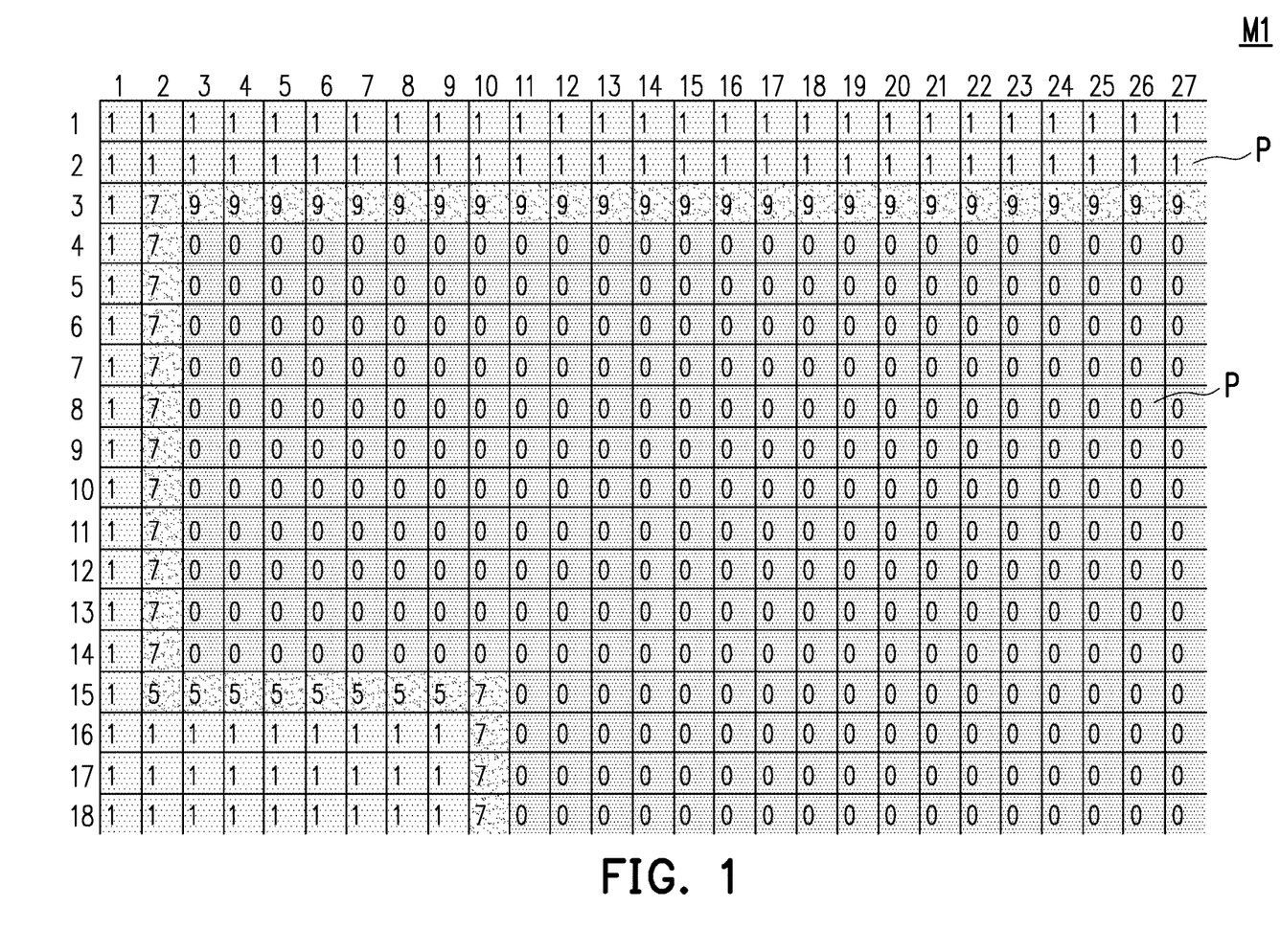
FIG. 1 is a schematic diagram illustrating a conventional representation of map data.

FIG. 1 is a schematic diagram illustrating a conventional representation of map data. Referring to FIG. 1, a map M1 is represented by a grid having a plurality of parcels P. The map M1 has rows 1~18 and columns 1~27, and has a total of 486 parcels P. The parcels P correspond to the cells of the grid. The number of rows, columns and parcels are as one embodiment only and the disclosure is not limited hereto. The number of rows, columns and parcels may be set according to requirements.

It should be noted, in the conventional representation of map M1 shown in FIG. 1, all of the plurality of parcels P are divided into equivalent row intervals and equivalent column intervals. The row interval and column interval may be, for example, 0.1 meter, 0.5 meters 1.5 meter, 2.0 meters, and the like and is not intended to limit the disclosure. In the map M1 shown in FIG. 1, the row interval and the column interval are the same, however in another embodiment of the disclosure, the row interval may differ from the column interval.

The map M1 may be stored in a processor or a memory of a robot. The robot may have a travelling unit. In addition, the robot may be a work machine having a working unit. The travelling unit may be, for example, a motor, an engine, a wheel, a propulsion system and/or the like which allows the robot to travel. The motor and/or engine may be powered by gas or battery and the like and is not intended to limit the disclosure. The work unit may be, for example, a blade for cutting grass or a plow for plowing snow, however the work unit of the disclosure is not limited thereto.

Each parcel P is assigned a characteristic value CV which represents a characteristic of the parcel P. For example, information relating to a travelability of an area represented by the parcel P is assigned to the characteristic value CV of each parcel P. In another example, information relating to a control of a working unit (blade, plow, etc.) of the robot at an area represented by the parcel P is assigned to the characteristic value CV of each parcel P.

Figure 2:
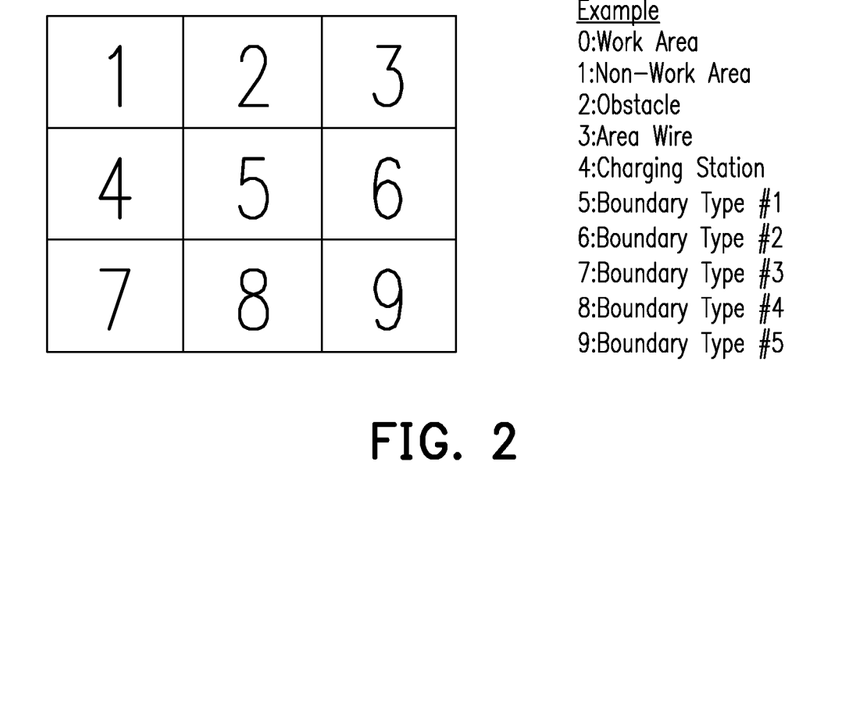
FIG. 2 illustrates an example of the information that is assigned to the characteristic values.

FIG. 2 illustrates an example of the information that is assigned to the characteristic values. Referring to FIG. 2, the characteristic value CV=0, for example, may represent a work area of the robot; the characteristic value CV=1, for example, may represent Non-work area of the robot; the characteristic value CV=2, for example, may represent an obstacle such as a tree or a rock or the like; the characteristic value CV=3, for example, may represent an area wire delineating a boundary of the work area; the characteristic value CV=4, for example, may represent a power charging station of the robot; the characteristic value CV=5-9, for example, may represent a boundary type such as a "do not cross boundary", a "crossable boundary", a "u-turn prior to boundary" and the like.

The above described information that are assigned to the characteristic values CV are examples only, and are not intended to limit the disclosure. Other information may be assigned to the characteristic values CV according to requirements. For example, the information assigned to a characteristic value may include information regarding a watering station for a plant watering robot. Furthermore, some characteristic values CV 1~9 were described in the example shown in FIG. 2, however the disclosure is not limited thereto and other numbers, for example, 13, 25, 77, 103 may be used for the characteristic values CV according to requirements. In addition, although nine characteristic values CV (1~9) were described in the example shown in FIG. 2, more than nine or less than nine characteristic values CV may be assigned as characteristic values CV according to requirements.

Figure 3:
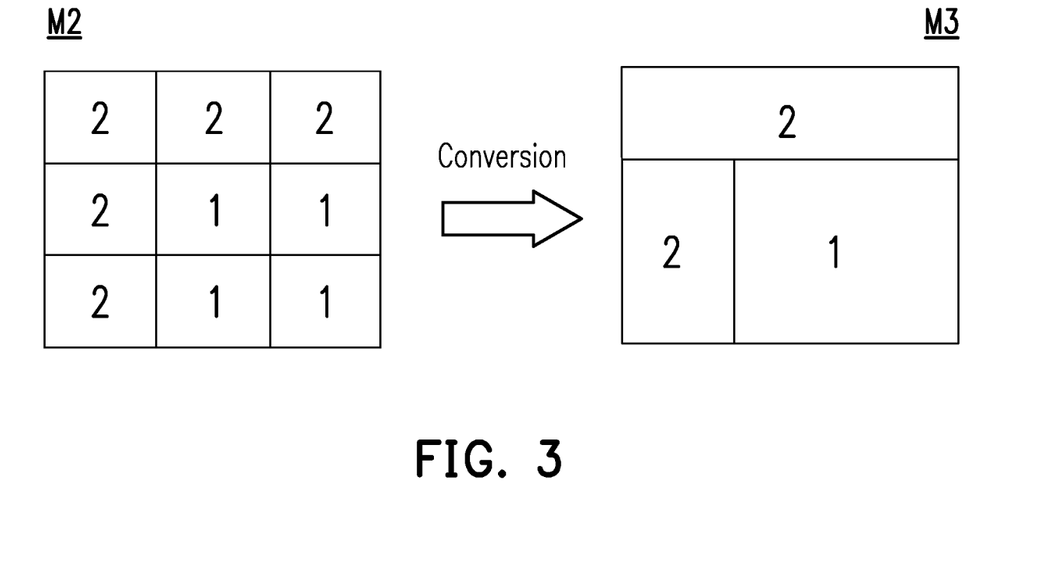
FIG. 3 illustrates a conversion of map data from a conventional representation to a representation according to an embodiment of the disclosure.

FIG. 3 illustrates a conversion of map data from a conventional representation to a representation according to an embodiment of the disclosure. Referring to FIG. 3, a map M2 and a map M3 are maps of a same area but with differing representation. The map M2 shown on the left is represented according to the conventional method. The map M3 shown on the right is represented according to an embodiment of the disclosure. The map M2 has 3 columns and 3 rows. A map area of the map M2 and a map area of the map M3 are the same. For example, assuming, for example, the row interval is 1.0 meters and the column interval is 1.0 meters, the map area of the map M2 and the map area of the map M3 both represent a map area of 3.0 meters×3.0 meters. In the conventional representation of the map M2, all of the plurality of parcels P are divided into equivalent row intervals and equivalent column intervals. In this way, the conventional representation of the map M2 requires a total of nine parcels P to represent the map M2.

Referring to FIG. 3, in the representation of map M3 according to an embodiment of the disclosure, each of the parcels P are not all divided into equivalent row intervals and equivalent column intervals. In other words, the row intervals and column intervals of the plurality of parcels P are different from each other, and are not all the same such as in the map M2. Accordingly, the conventional representation of the map data M2 required a total of nine parcels P to represent the map M2, however the representation of the map M3 according to an embodiment of the disclosure requires less than nine parcels P to represent the map M3. The map M3 in FIG. 3 is represented by a total of three parcels P. The map M2 and the map M3 are maps of the same area but with differing representation.

Next, a conventional representation of map data will be explained.

Figure 4:
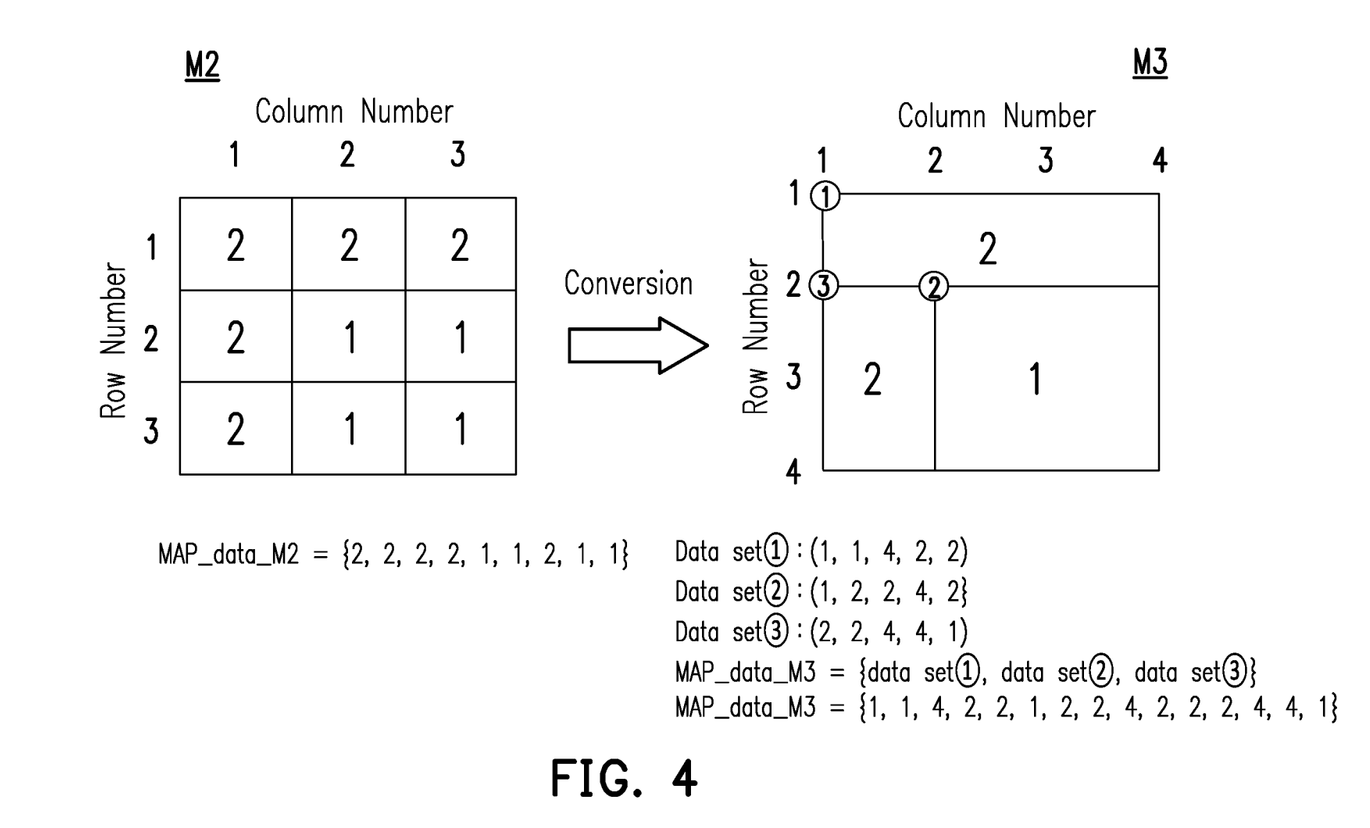
FIG. 4 shows a column number and row number assigned to the map according to a conventional representation, compared to a vertex number representation assigned to the map according to an embodiment of the disclosure.

FIG. 4 shows a column number and row number assigned to the map according to a conventional representation, compared to a vertex number representation assigned to the map according to an embodiment of the disclosure. Referring to FIG. 4, the map M2 has 3 rows and 3 columns, and has 9 parcels P. Each parcel P is assigned a row number and a column number. A characteristic value CV is assigned to each parcel P. The characteristic values CV assigned to each parcel P is an example only, and the disclosure is not limited hereto. The characteristic values CV may be assigned according to requirements.

Referring to FIG. 4, in the map M2, all of the plurality of parcels P are divided into equivalent row intervals. Furthermore, in the map M2, all of the plurality of parcels P are divided into equivalent column intervals. In the map M2, the row interval and the column interval are the same, however in another embodiment of the disclosure, the row interval may differ from the column interval. By knowing the total number of columns and the total number of rows in the map M2, a map data MAP_data_M2 of the map M2 may be represented by listing the characteristic value CV of each parcel P in order. Here, the characteristic value CV of each parcel P is listed in order with priority given to the column number such that map data MAP_data_M2={2, 2, 2, 2, 1, 1, 2, 1, 1}. When priority is given to the column number, the map data MAP_data_M2={2, 2, 2, 2, 1, 1, 2, 1, 1}. In the present embodiment of FIG. 4, the representation of the map data when priority is given to the column number is the same representation as when priority is given to the row number. Whether priority is given to the column number or the row number is not intended to limit the disclosure, and may be set according to requirements.

It should be noted, a prerequisite to the conventional method of representing the Map data MAP_data_M2 by listing only the characteristic value CV of each parcel P in order is that all of the plurality of parcels P of the map M2 are of the same size, since the area size of each parcel P is not listed in the map data representation. In other words, the prerequisite to the conventional method of representing map data MAP_data_M2 is that each of the parcels P is divided into the equivalent row interval and the equivalent column interval.

A deficiency in representing the map data MAP_data_M2 according to the conventional method (by listing only the characteristic value CV of each parcel P in order of row number or column number) is that when the number of columns and the number of rows are doubled, the number of parcels P are quadrupled, which causes the number parcels P for a larger map (or a map having small interval) to become large. For example, for map M2 that has 3 rows and 3 columns, then 9 parcels P are needed to represent nine characteristic values CV. However, for a map that has, for example, 6 rows and 6 columns, then 36 parcels P are needed for representing thirty-six characteristic values CV.

When trying to fit the map data that has 6 rows and 6 columns into the same data size as map data that has 3 rows and 3 columns, then the grid interval must be increased (roughened). For example, if the map has a row interval of 1.0 meters and a column interval of 1.0 meters, then the map that has 3 rows and 3 columns may represent a map area of 3.0 meters×3.0 meters. In comparison, when the map is created for representing a map area of 6.0 meters×6.0 meters, the number of parcels P is quadrupled from 9 parcels P to 36 parcels P, assuming that the row interval and column interval are both maintained at 1.0 meters. In order to fit the map data representing a 6.0×6.0 meter area into the same data size of map data that representing a 3.0×3.0 meter area, the row interval may be increased to 2.0 meters and the column interval may be increased to 2.0 meters. In this way, by increasing the row interval to 2.0 meters and the column interval to 2.0 meters, the map that has a 6.0×6.0 meter area may be represented by 9 parcels P, which is the same number of parcels P as the map that has a 3.0×3.0 meter area. However, when the grid interval (row interval and/or column interval) is increased to 2.0 meters, the resolution of the map is decreased.

Next, a map data representation according to an embodiment of the disclosure will be explained.

Referring to FIG. 4, the map M3 has 3 rows and 3 columns representing a map area of 3.0 meters×3.0 meters. The map M3 has three parcels P. A vertex ①-③ is assigned to each of the three parcel P. A map data MAP_data_M3 according to an embodiment of the disclosure is represented by a plurality of data sets representing the vertexes ①-③. In more detail, the map M3 is represented according to an embodiment of the disclosure by the map data MAP_data_M3={1, 1, 4, 2, 2, 1, 2, 2, 4, 2, 2, 2, 4, 4, 1}. The first five numbers corresponds to a data set①, which is the data set representing the vertex①. The sixth to tenth numbers corresponds to a data set②, which is the data set representing the vertex②. The eleventh to fifteenth numbers corresponds to a data set③, which is the data set representing the vertex③.

That is to say, data set①=(1, 1, 4, 2, 2); data set②=(1, 2, 2, 4, 2); data set③=(2, 2, 4, 4, 1). Consequently, the map data is represented by map data M3={data set①, data set ②, data set③}.

Each data set①~③ assigned to each parcel P includes a grid value GV representing a shape of the parcel P, and a characteristic value CV representing a characteristic of the parcel P. The grid value GV in each data set of each parcel is assigned two vertex values to represent the shape of the parcel. That is to say, the grid value GV includes a first vertex value detailing the row number and the column number of a top left vertex of the parcel P, and a second vertex value detailing the row number and the column number of a bottom right vertex of the parcel P. In another embodiment of the disclosure, the first vertex value may include the information detailing the row number and the column number of top right vertex of the parcel P, and the second vertex value detailing the information about the row number and the column number of bottom left vertex of the parcel P. The specific representations of the first vertex value and the second vertex value may be set according to requirements.

Since not all of the plurality of parcels P of the Map M3 are of the same size, the first vertex value and the second vertex value included in the grid value GV identifies the shape of the parcel P. Furthermore, a size of the parcel P may be derived by calculation using the first vertex value and the second vertex value. In more detail, the first two values in the data set①=(1, 1, 4, 2, 2) make up the column number and row number of the first vertex value. The third and fourth number in the data set①=(1, 1, 4, 2, 2) make up the column number and row number of the second vertex value. Therefore, a size of the parcel P may be calculated using a difference between the column numbers and a difference between the row numbers of the first vertex value and the second vertex value. The fifth number in the data set①=(1, 1, 4, 2, 2) make up the characteristic value CV of the parcel P.

In other words, each of the data sets ①~③ are made up by five values. The five values representing each data set ①~③ are {column number of vertex, row number of vertex, column number of vertex located at adjacent right, row number of vertex located at adjacent bottom, characteristic value CV}. The five values {column number of vertex, row number of vertex, column number of vertex located at adjacent right, row number of vertex located at adjacent bottom, characteristic value CV} make up a data set, and the data set is assigned to each parcel P such that the map M3 is represented by a plurality of data sets①~③.

Figure 5:
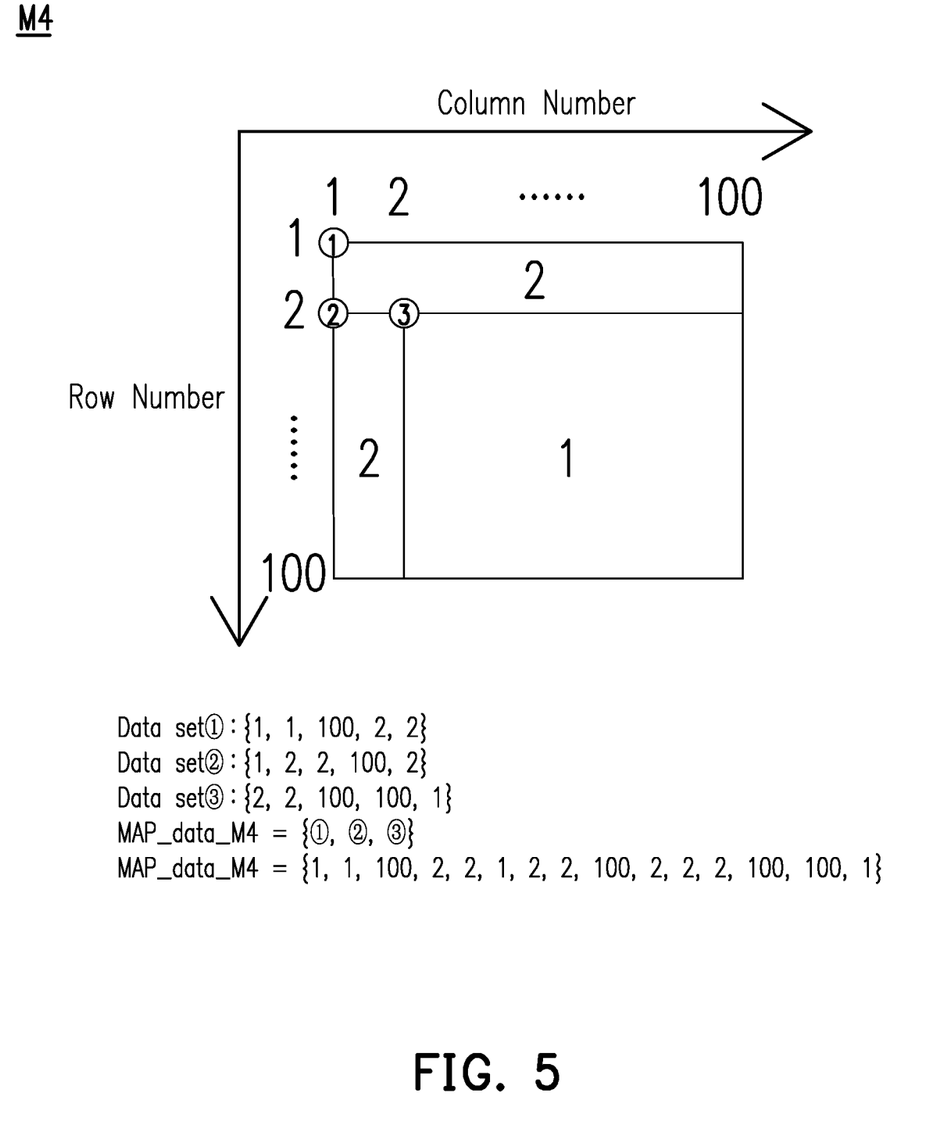
FIG. 5 shows a map data representation according to an embodiment of the disclosure.

FIG. 5 shows a map data representation according to an embodiment of the disclosure. Referring to FIG. 5, a map M4 has 100 columns and 100 rows. Assuming the row interval is 1.0 meters and the column interval is 1.0 meters, the map area of the map M4 represent a map area of 100 meters×100 meters. That is to say, a map area of the map M4 is larger than a map area of the map M2 and map M3, since the map M2 and map M3 represent a map area of 3 meters×3 meters. However, the map M4 according to an embodiment of the disclosure is represented by a total of three parcels P, while the map M3 is also represented by a total of three parcels P, while the map M2 is represented by a total of nine parcels P. A conventional representation of the map M4 having 100 columns and 100 rows would require a total of 10,000 parcels to represent the map. Therefore, in the map M4 representation according to an embodiment of the disclosure, the data size of the map M4 may be reduced since only three parcels P are needed to represent the map M4.

When the data size of the map is decreased, then the hardware specification required for the autonomous work vehicle may be lowered.

Next, a method of converting the conventional representation to a representation according to an embodiment of the disclosure will be explained.

Figure 6:
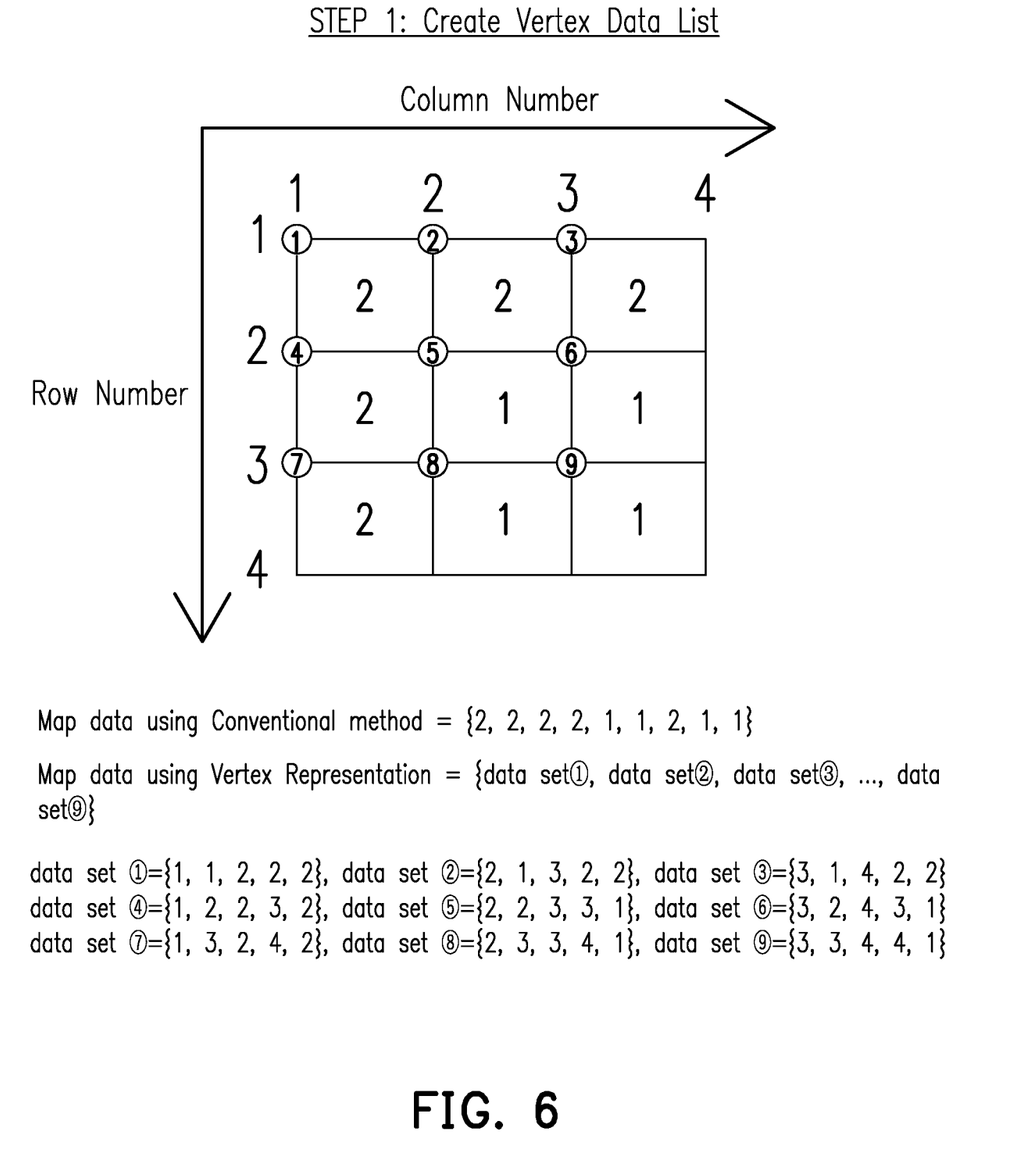
FIG. 6 illustrates STEP 1 of converting map from a conventional representation to a representation according to an embodiment of the disclosure.

FIG. 6 illustrates STEP 1 of converting map from a conventional representation to a representation according to an embodiment of the disclosure. Referring to FIG. 6, a column number and a row number are not assigned to each parcel P, but rather the column number and the row number are assigned to the border line (cell line) between adjacent parcels P. Accordingly, in the vertex representation according to the present embodiment, there will be one additional row number and one additional column number compared to the representation by the conventional method. Next, the conventional representation of map data is converted to a vertex representation by assigning the vertexes ①~⑨ to each parcel P. It should be noted, the conventional representation of map data is converted to a vertex representation while maintaining the equal column interval and equal row interval.

Referring to FIG. 6, a first vertex ① is assigned to the vertex where the column 1 and row 1 converges; a second vertex ② is assigned to the vertex where the column 2 and row 1 converges; a third vertex ③ is assigned to the vertex where the column 3 and row 1 converges; a fourth vertex ④ is assigned to the vertex where the column 1 and row 2 converges; a fifth vertex ⑤ is assigned to the vertex where the column 2 and row 2 converges; a sixth vertex ⑥ is assigned to the vertex where the column 3 and row 2 converges; a seventh vertex ⑦ is assigned to the vertex where the column 1 and row 3 converges; an eight vertex ⑧ is assigned to the vertex where the column 2 and row 3 converges; a ninth vertex ⑨ is assigned to the vertex where the column 3 and row 3 converges.

Referring to FIG. 6, a data set (data sets ①~⑨ is assigned to each parcel P. Each data set①~⑨ assigned to each parcel P includes a grid value GV representing a shape of the parcel P, and a characteristic value CV representing a characteristic of the parcel P. That is to say, each data set①~⑨ is assigned five values including {column number of vertex, row number of vertex, column number of vertex located at adjacent right, row number of vertex located at adjacent bottom, characteristic value CV} to make up each data set.

According to the map data representation of the disclosure, the data sets ①~⑨ shown in FIG. 6 may be represented as below:

Example of Data Set ①~⑨ Shown in FIG. 6
  data set ①={1, 1, 2, 2, 2}, data set ②={2, 1, 3, 2, 2}, data set ③={3, 1, 4, 2, 2}
  data set ④={1, 2, 2, 3, 2}, data set ⑤={2, 2, 3, 3, 1}, data set ⑥={3, 2, 4, 3, 1}
  data set ⑦={1, 3, 2, 4, 2}, data set ⑧={2, 3, 3, 4, 1}, data set ⑨={3, 3, 4, 4, 1}

In this way, the map data M3 may be represented as map data M3={data set ①, data set ②, data set ③, data set ④, data set ⑤, data set ⑥, data set ⑦, data set ⑧, data set ⑨}.

In the present disclosure, each parcel P is a rectangular shape. Furthermore, the grid value in each data set of each parcel is assigned two vertex values to represent the shape of the parcel P.

Figure 7:
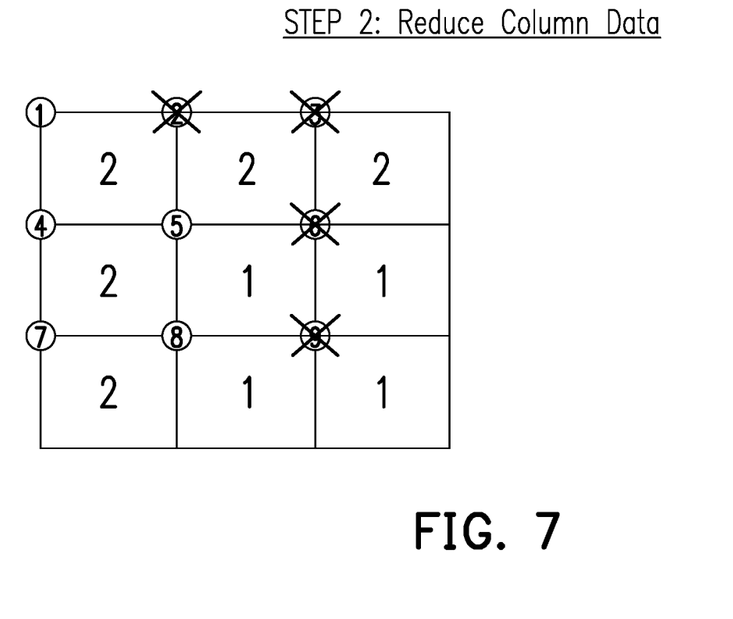
FIG. 7 illustrates STEP 2 of converting map data from a conventional representation to a representation according to an embodiment of the disclosure.

FIG. 7 illustrates STEP 2 of converting map data from a conventional representation to a representation according to an embodiment of the disclosure. In STEP 2, parcels among the plurality of parcels that are divided into equivalent column intervals are obtained, and when the characteristic values of two adjacent parcels having equivalent column intervals are equal to each other, the two adjacent parcels are integrated into one parcel and the grid value of the one parcel is updated.

Specifically, referring to FIG. 7, parcels P in adjacent columns having the same row interval, and having the same characteristic value CV consecutively repeated are deleted. Referring FIG. 7, the vertex①, vertex② and vertex③ all have characteristic values CV of "2" consecutively repeated. Accordingly, the vertex② and the vertex③ are both deleted, and consequently the data set② and data set③ are deleted.

After deleting the data set② and data set③, then the data set① is updated from data set①={1, 1, 2, 2, 2} into data set ①={1, 1, 4, 2, 2}. That is to say, the column number of the second vertex value is updated from "2" to "4". This process is performed for each row of the map data.

Figure 8:
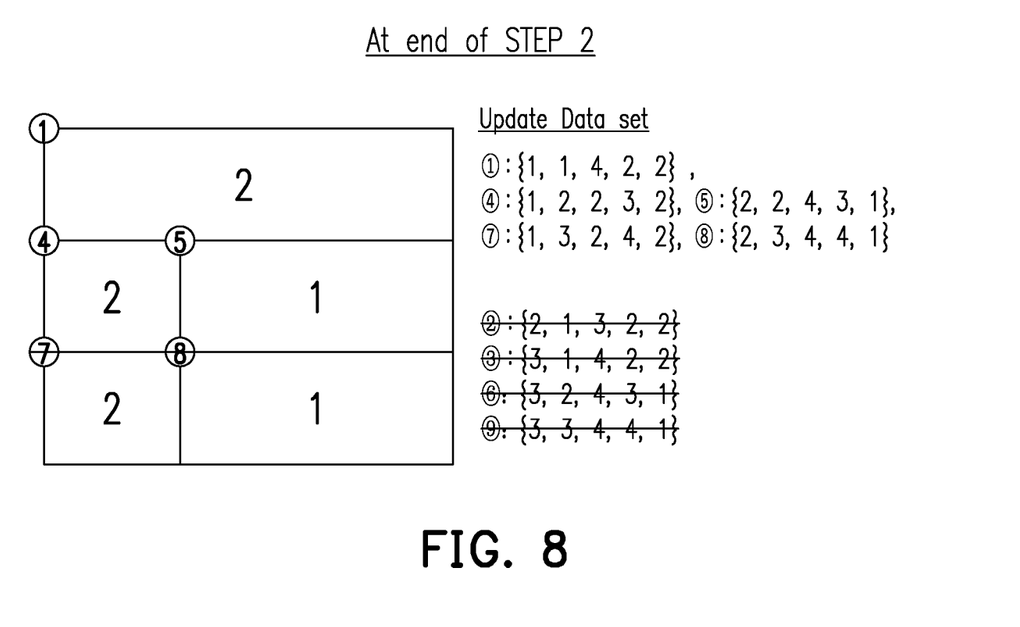
FIG. 8 illustrates the conversion at the end of STEP 2.

FIG. 8 illustrates the conversion at the end of STEP 2. At the end of STEP 2, the vertex②, vertex③, vertex⑥, vertex⑨ are deleted, and consequently the data set②, data set③, data set⑥, data set⑨ are deleted. The data set①, data set④, data set⑤, data set⑦, data set⑧ remain. Then, the data set①, data set④, data set⑤, data set⑦, data set⑧ are updated as below:
 data set①={1, 1, 4, 2, 2}
 data set④={1, 2, 2, 3, 2}, data set⑤={2, 2, 4, 3, 1}
 data set①={1, 3, 2, 4, 2}, data set⑧={2, 3, 4, 4, 1}

Figure 9:
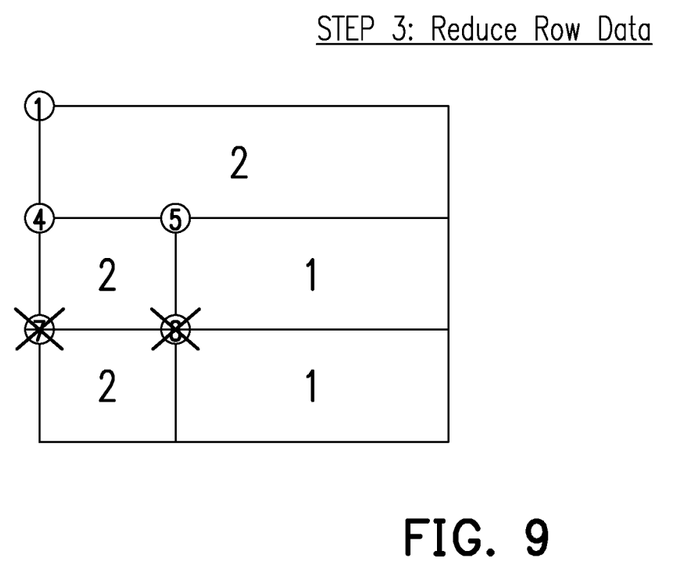
FIG. 9 illustrates STEP 3 of converting map data from a conventional representation to a representation according to an embodiment of the disclosure.

FIG. 9 illustrates STEP 3 of converting map data from a conventional representation to a representation according to an embodiment of the disclosure. In STEP 3, parcels among the plurality of parcels that are divided into equivalent row intervals are obtained, and when the characteristic values of two adjacent parcels having equivalent row intervals are equal to each other, the two adjacent parcels are integrated into one parcel and the grid value of the one parcel is updated. That is to say, parcels P in adjacent rows having the same column interval, and having the same characteristic value CV consecutively repeated are deleted.

Referring to FIG. 9, the parcels P in row 1 and row 2 have different parcel sizes, therefore vertex④ and vertex⑤ cannot be deleted. Regarding row 3, since vertex⑦ has a same column interval as vertex④, and both have the same characteristic value CV of "2", then vertex⑦ is deleted. Similarly, since vertex⑧ has a same column interval as vertex⑤, and both have the same characteristic value CV of "1", then vertex⑧ is deleted.

Figure 10:
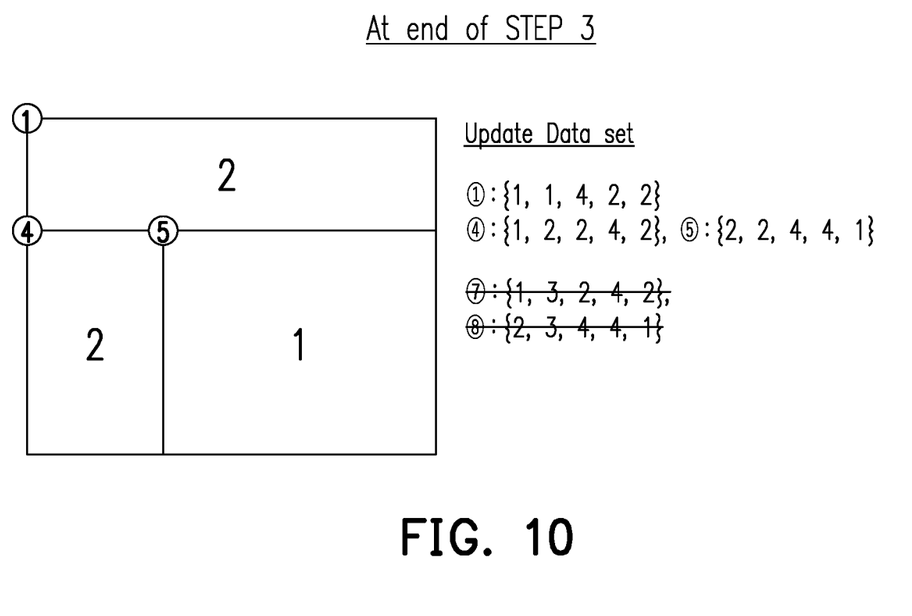
FIG. 10 illustrates the conversion at the end of STEP 3.

FIG. 10 illustrates the conversion at the end of STEP 3. At the end of STEP 3, the vertex⑦, vertex⑧ are deleted, and consequently the data set⑦, data set⑧ are deleted. The data set①, data set④, data set⑤ remain in the map data. Then, the data set①, data set④, data set⑤ are updated as below:
 data set①={1, 1, 4, 2, 2}
 data set④={1, 2, 2, 4, 2}, data set⑤={2, 2, 4, 4, 1}

The map data M3 is now represented by map data M3={1, 1, 4, 2, 2, 1, 2, 2, 4, 2, 2, 2, 4, 4, 1}. Consequently, the map data is represented by map data M3={data set①, data set ④, data set⑤}. Alternatively, the data set④ and data set⑤ may be re-numbered as data set② and data set③ according to requirements, such that the map data may be represented by map data M3={data set①, data set②, data set③}.

In STEP 2 illustrated in FIG. 7, when the characteristic values of two adjacent parcels having equivalent "COLUMN" intervals are equal to each other, the two adjacent parcels are integrated into one parcel and the grid value of the one parcel is updated. In STEP 3 illustrated in FIG. 9, when the characteristic values of two adjacent parcels having equivalent "ROW" intervals are equal to each other, the two adjacent parcels are integrated into one parcel and the grid value of the one parcel is updated. Although in the present explanation, STEP 2 was performed before STEP 3, however the disclosure is not limited thereto. In another embodiment of the disclosure, STEP 3 may be performed before STEP 2. In addition, in another embodiment of the disclosure, only one of STEP 2 or STEP 3 may be performed. Accordingly, STEP 2 illustrated in FIG. 7, and STEP 3 illustrated in FIG. 9 both show when parcels among the plurality of parcels that are divided into equivalent intervals are obtained, and when the characteristic values of two adjacent parcels having equivalent intervals are equal to each other, the two adjacent parcels are integrated into one parcel and the grid value of the one parcel is updated.

Figure 11:
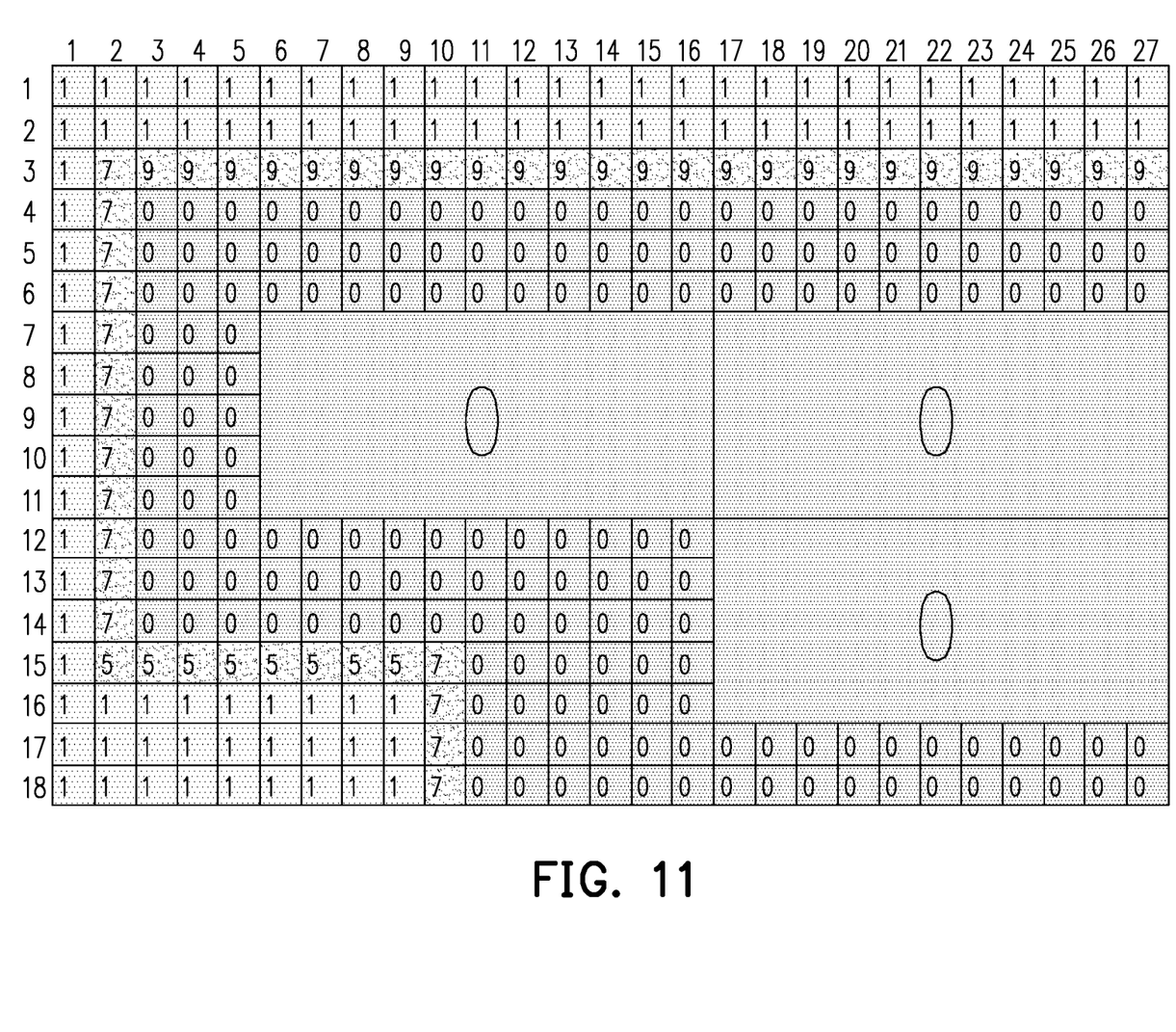
FIG. 11 is a schematic diagram illustrating the map data of FIG. 1 using a representation of map data according to an embodiment of the disclosure.

FIG. 11 is a schematic diagram illustrating the map data of FIG. 1 using a representation of map data according to an embodiment of the disclosure. It should be noted, in the representation of map data according to the present disclosure, the row interval and column interval of the plurality of parcels P may be different from each other. In more detail, the grid interval (row interval and/or column interval) is increased at a particular area where the same characteristic values CV are consecutively repeated.

Referring to FIG. 11, the grid interval is increased at a plurality of particular areas where the characteristic value CV of 0 is consecutively repeated. By increasing the grid interval at a particular area where the same characteristic values CV are consecutively repeated, a data size of the map data may be reduced.

Comparing to FIG. 1, in the map data M in which all parcels P have equivalent intervals, the conventional method of representing map data M becomes wasteful because a characteristic value CV of 0 is required to be kept for each parcel P, even in a case when the characteristic value CV of 0 is consecutively repeated.

In the example embodiment of FIG. 11, the characteristic values CV of "5", "7", "9" which represent a predetermined boundary type are represented by a relatively finer grid interval compared to some of the grid intervals of the characteristic values CV of "0" which represent the work area. Similarly, the characteristic values CV of "1" which represent a non-work area are represented by a relatively finer grid interval compared to some of the grid intervals of the characteristic values CV of "0" which represent the work area. In the representation of map data according to the example embodiment of FIG. 11, the grid resolution may be maintained at a higher resolution near or around the borders, and the resolution may be decreased (i.e. increased grid interval) at non-border areas and areas where there are fewer or no obstacles. The resolution at each particular area such as the borders or areas where there are fewer or no obstacles may be set according to requirements and is not intended to limit the disclosure.

It should be noted, the configuration of FIG. 11 is an example configuration only, and the disclosure is not limited thereto. In another embodiment of the disclosure, some grid intervals of the characteristic values CV of "0", "1", "5", "7", "9" repeated consecutively near or at the border may also be represented by an increased grid interval according to requirements.

Figure 12A:
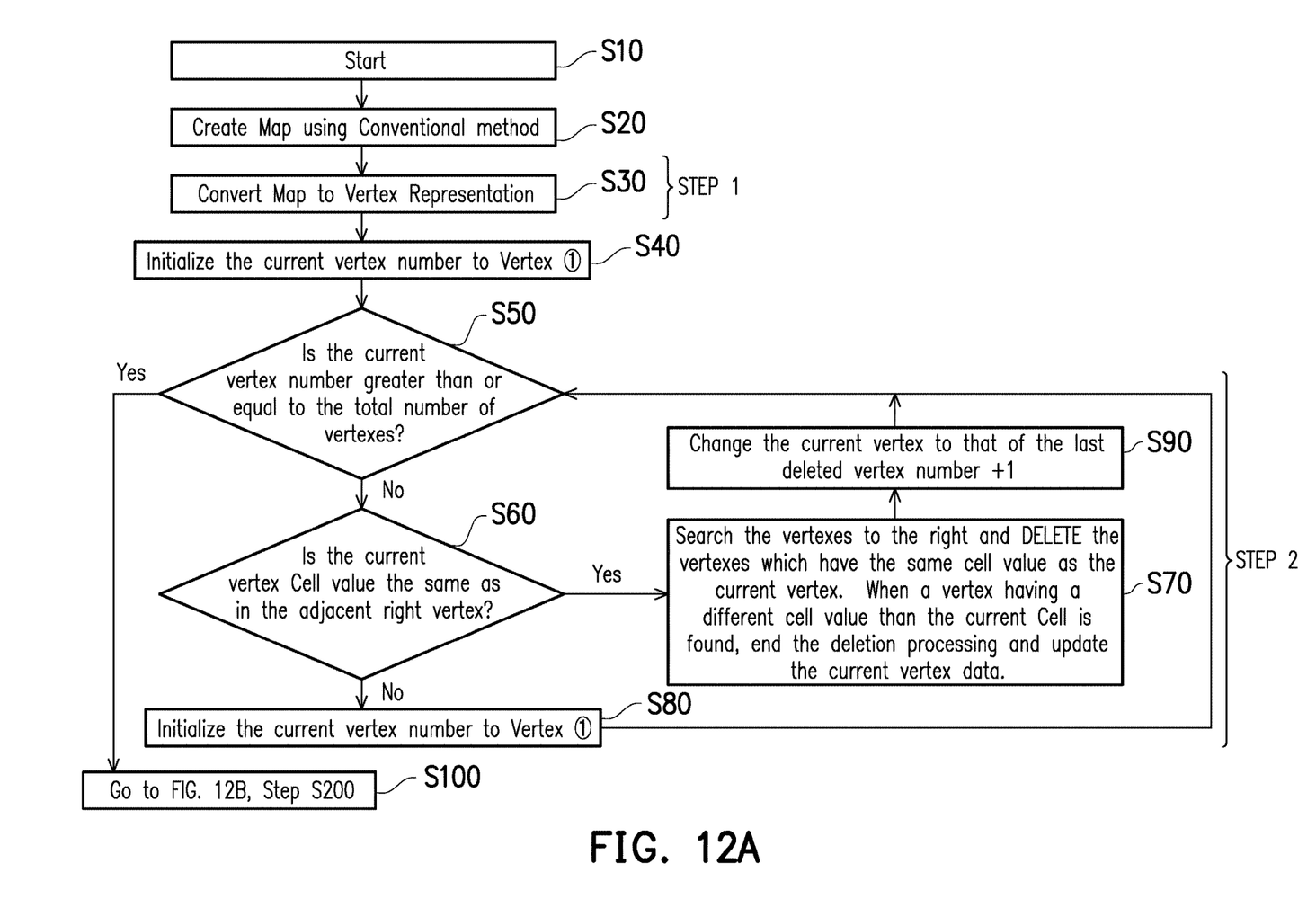
FIG. 12A and FIG. 12B illustrate a flow chart of converting map data from a conventional representation to a representation according to an embodiment of the disclosure.

FIG. 11A and FIG. 11B illustrates a flow chart of converting map data from a conventional representation to a representation according to an embodiment of the disclosure. Referring to FIG. 11A, in step S20, create a map using the conventional method. Next, in step S30, convert the map data to vertex representation. In step S40, initialize the current vertex number to vertex①.

In step S50, compare is the current vertex number greater than or equal to the total number of vertexes. If "no", proceed to step S60.

In step S60, compare is the current vertex cell value the same as in the adjacent right vertex. If "yes", proceed to step S70.

In step S70, search the vertexes to the right and DELETE the vertexes which have the same cell value as the current vertex. When a vertex having a different cell value than the current Cell is found, end the deletion processing and update the current vertex data.

After the completion of step S70, proceed to step S90 and change the current vertex to that of the last deleted vertex number+1. After the completion of step S90, repeat step S50.

If the answer to step S60 is "no", proceed to step S80. In step S80, add+1 to the current vertex number. After the completion of step S90, repeat step S50.

Figure 12B:
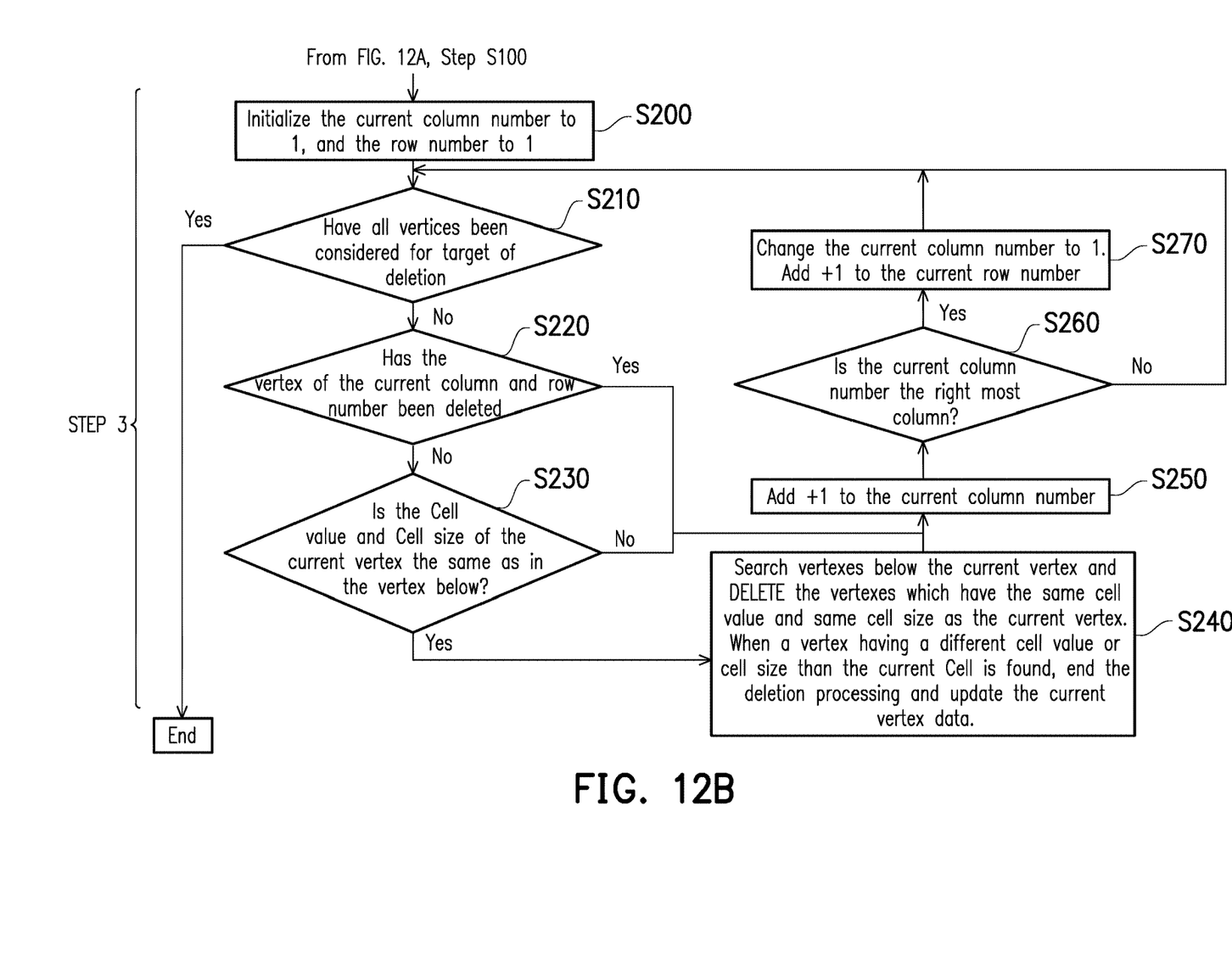

If the answer to step S50 is "yes", proceed to step S200 of FIG. 11B.

In step S200, initialize the current column number to 1, and the row number to 1.

In step S210, check have all vertices been considered for target of deletion. If "no", proceed to step S220.

In step S220, check has the vertex of the current column and row number been deleted. If "yes", proceed to step S250.

If the answer to step 220 is "no", proceed to step S230. In step S230, check is the cell value and cell size of the current vertex the same as in the vertex below. If "no", proceed to step S250. If "yes", proceed to step S240.

In step S240, search vertexes below the current vertex and DELETE the vertexes which have the same cell value and same cell size as the current vertex. When a vertex having a different cell value or cell size than the current Cell is found, end the deletion processing and update the current vertex data.

After the completion of step S240, proceed to step S250.

In step S250, add+1 to the current column number. After the completion of step

S250, proceed to step S260.

In step S260, check is the current column number the right most column. If "no", repeat step S210. If the answer to step S260 is "yes", proceed to step S270 and change the current column number to 1, and add+1 to the current row number. After the completion of step S270, repeat step S210.

If the answer to step S210 is "yes", then map data conversion is completed.

Although embodiments of the map data according to the disclosure have been described above based on some examples, the disclosure is not limited thereto.

The map having the map representation according to an embodiment of the disclosure may be created, for example, prior to work being performed by the robot or during setup of the robot. Furthermore, regional area data registered by a user or a dealer may be transmitted to a server and/or the robot, and the map data reduced by a processor or the like.

The robot may detect a position of the robot, for example, via a GPS receiver mounted to the robot. The robot may determine whether a current position of the robot is inside a particular cell or parcel based on the GPS information of the robot and the vertex values in the map having unequal row intervals and/or column intervals.

In general, a minimum row interval and a minimum column interval may be, for example, approximately 10 centimetres. However, the row interval and column interval may be made as fine as is necessary for control of the robot, or as fine as the memory storage of the robot allows.

The shape of the parcel P which may be represented by the two vertex values is a rectangle. The details of other shapes such as a triangle or polygon cannot be represented by the two vertex values. Accordingly, the rectangle allows for the most reduction in data size.

When the map is to be updated in a case such as when a location of obstacles change, information detected by the robot or data relating to the work load of the work unit of the robot may be uploaded, for example, to a server where the regional area data is updated and downloaded to the robot.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for converting a map to be used in an autonomous work vehicle, the method for converting the map comprising:
    a step of representing the map using a plurality of rectangular parcels that are arranged in a plurality of rows and a plurality of columns, each rectangular parcel of the plurality of rectangular parcels is assigned a characteristic value representing a characteristic of the rectangular parcel,
    a step of converting a representation of the map from a representation using the plurality of rows and the plurality of columns to a vertex representation,
    a step of integrating rows, wherein two rectangular parcels in adjacent rows of a same column that have equal characteristic values are integrated into one rectangular parcel and the vertex representation of the one rectangular parcel is updated,
    wherein the autonomous work vehicle is controlled using the map represented by the vertex representation,
    wherein the map includes at least a first characteristic value, and a second characteristic value different from the first characteristic value,
    wherein after the step of integrating rows is performed for each of the plurality of columns, a step of integrating columns is performed,
    wherein the step of integrating columns comprises:
        obtaining two rectangular parcels in adjacent columns that are divided into equivalent row intervals, and when the two rectangular parcels in adjacent columns that have equivalent row intervals also have equal characteristic values, the two rectangular parcels in adjacent columns that have equivalent row intervals and equal characteristic values are integrated into one rectangular parcel and the vertex representation of the one rectangular parcel is updated.

2. The method for converting the map according to claim 1, wherein in the step of converting, a data set is assigned to each rectangular parcel of the plurality of rectangular parcels such that the map is represented by a plurality of data sets,
    wherein each data set assigned to each rectangular parcel includes:
        the characteristic value representing the characteristic of the rectangular parcel, the characteristic value of the rectangular parcel represents information relating to a travelability of the rectangular parcel, or information relating to a control of a tool disposed on the autonomous work vehicle in the rectangular parcel, and a first vertex value, representing a first vertex of the rectangular parcel;

a second vertex value, representing a second vertex of the rectangular parcel opposite to the first vertex.

3. A method for converting a map to be used in an autonomous work vehicle, the method for converting the map comprising:

a step of representing the map using a plurality of rectangular parcels that are arranged in a plurality of rows and a plurality of columns, each rectangular parcel of the plurality of rectangular parcels is assigned a characteristic value representing a characteristic of the rectangular parcel, a step of converting a representation of the map from a representation using the plurality of rows and the plurality of columns to a vertex representation, a step of integrating columns, wherein two rectangular parcels in adjacent columns of a same row that have equal characteristic values are integrated into one rectangular parcel and the vertex representation of the one rectangular parcel is updated, wherein the autonomous work vehicle is controlled using the map represented by the vertex representation, wherein the map includes at least a first characteristic value, and a second characteristic value different from the first characteristic value, wherein after the step of integrating columns is performed for each of the plurality of rows, a step of integrating rows is performed, wherein the step of integrating rows comprises:

obtaining two rectangular parcels in adjacent rows that are divided into equivalent column intervals, and when the two rectangular parcels in adjacent rows that have equivalent column intervals also have equal characteristic values, the two rectangular parcels in adjacent rows that have equivalent column intervals and equal characteristic values are integrated into one rectangular parcel and the vertex representation of the one rectangular parcel is updated.

4. The method for converting the map according to claim 3, wherein in the step of converting, a data set is assigned to each rectangular parcel of the plurality of rectangular parcels such that the map is represented by a plurality of data sets, wherein each data set assigned to each rectangular parcel includes:

the characteristic value representing the characteristic of the rectangular parcel, the characteristic value of the rectangular parcel represents information relating to a travelability of the rectangular parcel, or information relating to a control of a tool disposed on the autonomous work vehicle in the rectangular parcel, and a first vertex value, representing a first vertex of the rectangular parcel;

a second vertex value, representing a second vertex of the rectangular parcel opposite to the first vertex.

* * * * *